United States Patent [19]
Vasseur et al.

[11] Patent Number: 5,207,601
[45] Date of Patent: May 4, 1993

[54] DEVICE FOR MECHANICAL AND ELECTRICAL ASSEMBLY OF MINIATURE MOLDED CASES

[75] Inventors: André Vasseur, Soignies; Claude Maton, Charleroi; Alain De Myttenaere, Brussels, all of Belgium

[73] Assignee: Merlin Gerin, Meylan, France

[21] Appl. No.: 878,458

[22] Filed: May 5, 1992

[30] Foreign Application Priority Data

May 16, 1991 [FR] France .................................. 91 05995

[51] Int. Cl.⁵ ............................................... H01R 9/22
[52] U.S. Cl. ..................................... 439/715; 439/513
[58] Field of Search ............... 439/507, 513, 709, 713, 439/715, 717; 361/376, 393, 426

[56] References Cited

U.S. PATENT DOCUMENTS

| | | | |
|---|---|---|---|
| 4,171,861 | 10/1979 | Hohorst | 439/513 X |
| 4,591,228 | 5/1986 | Vasseur . | |
| 4,709,300 | 11/1987 | Landis | 439/513 X |
| 4,950,178 | 8/1990 | Harvey et al. | 439/507 |
| 4,989,118 | 1/1991 | Sorenson | 439/715 X |

FOREIGN PATENT DOCUMENTS

| | | |
|---|---|---|
| 1948971 | 4/1971 | Fed. Rep. of Germany . |
| 2135728 | 2/1972 | Fed. Rep. of Germany . |
| 2550907 | 2/1985 | France . |
| 2029109 | 3/1980 | United Kingdom . |
| 2191041 | 12/1987 | United Kingdom . |

Primary Examiner—Larry I. Schwartz
Assistant Examiner—Khiem Nguyen
Attorney, Agent, or Firm—Parkhurst, Wendel & Rossi

[57] ABSTRACT

A runner (20) for mechanical assembly between two miniature molded cases (10,11) performs at the same time the electrical connection of the control circuits of the two cases (10,11). For this purpose, contact pads (27) are arranged in the bottom of the slide (19) in which the runner (20) slides, the runner (20) bearing a contact bridge cooperating with contact pods (27).

5 Claims, 3 Drawing Sheets

DEVICE FOR MECHANICAL AND ELECTRICAL ASSEMBLY OF MINIATURE MOLDED CASES

BACKGROUND OF THE INVENTION

The invention relates to a device for assembling two adjacent molded cases housing miniature electrical switchgear having a circuit, notably a control circuit, connected to two external connection terminals, comprising a fast-fixing connecting runner which in the active position overlaps the interface of the two cases, and whose parts protruding on both sides of said interface are each secured to one of the cases to mechanically assemble the two cases.

An assembly device of the kind mentioned, described in U.S. Pat. No. 4,591,228, enabled a modular low voltage miniature electrical switchgear system to be achieved. The switchgear generally comprises control circuits or auxiliary circuits which have to be interconnected when two or more modules are assembled. In the simplest example of a two-pole remote-controlled switch achieved by assembly of two single-pole remote-controlled switches, the two operating coils must be connected in parallel to ensure simultaneous operation of the two controls. This paralleling can be achieved at the level of the external connection terminals of the control circuit, but fitting of these connections complicates assembly.

SUMMARY OF THE INVENTION

The object of the present invention is to improve the above-mentioned mechanical assembly device, by associating with it the electrical connection function of the circuits, notably the control circuit of the assembled cases.

The assembly device according to the invention is characterized in that said runner is arranged as an electrical contact bridge, which cooperates in the active position with contact pads arranged on each of said cases, facing said protruding parts of the runner to achieve an electrical connection between said pads and that an electrical connection is arranged between said external connection terminal and said contact pad of one and the same case.

Fitting the mechanical assembly runner of the two modules therefore automatically ensures their electrical connection and prevents any risk of wiring errors. The runner is advantageously, in the manner described in the above-mentioned patent, arranged in the form of a slider, capable of being moved in slides arranged on the narrow side faces of the cases. In the active assembled position, the slider overlaps the interface between the two cases, and the parts protruding on both sides of this interface are clipped onto protrusions arranged in the slides. The reader should advantageously refer to the above-mentioned patent for further details on the embodiment of the runner and associated slides.

The contact pad, which cooperates with the runner, is preferably housed in the bottom of the slide, in particular in the bottom of a groove made in the slide, the entrance to this groove being sufficiently narrow to prevent any accidental contact. The runner bears an electrical contact bridge capable of being inserted in said groove to come into contact with the contact pad in the active position of the runner. The contact bridge can be achieved in different ways and notably comprise an elongated flexible metal blade extending in the longitudinal direction of the runner. The contact bridge can also result from a metal deposit on an insulating part coming from casting with the runner.

The standard case comprises external connection terminals of the control or auxiliary circuit and according to a development of the invention, these terminals are used for connecting the contact pads which cooperate with the runner.

The connecting conductor can be arranged as a strip, one end of which is inserted in the connection terminal, and the other end of which is shaped as a contact pad. In the case of an assembly without electrical connection between the two cases, it is possible to use a runner without a contact bridge or not to provide on the case involved the contact pad normally cooperating with the runner. Fitting of these contact pads can be carried out in the factory or be entrusted to the user depending on the assemblies required.

The assembly device according to the invention has been designed particularly for remote-controlled switches, but it is clear that it can be used for assembly of molded cases containing other electrical switchgear. In the case of remote-controlled switches, it can mechanically assemble two or more poles to form multipole remote-controlled switches, parallel connection of the operating coils of each pole being performed by the runners provided with contact bridges. The same device is used for assembling auxiliary modules to remote-controlled switch modules, these auxiliary modules being able to contain differentiation circuits of the closing order and of the opening order, or remote control circuits via data transmission buses, or load circuits connected in parallel to the coil of the remote-controlled switch to prevent nuisance orders, or any other auxiliary control and/or signalling circuit.

Each case advantageously comprises two runners each mounted in a slide arranged on one of the small side faces of the case, which also bears the power connection terminals and the control circuit terminals. The same runner can be moved indifferently to one side or to the other according to the position of the associated case. This device enables any number of modules to be assembled, some of which can be electrically interconnected by these runners, whereas others are simply mechanically secured, and the unit formed by these assembled modules can be clipped in the usual manner onto a support rail, notably of symmetrical profile.

BRIEF DESCRIPTION OF THE DRAWINGS

Other advantages and features will become more clearly apparent from the following description of an illustrative embodiment of the invention, given as a non-restrictive example only and represented in the accompanying drawings in which.

DESCRIPTION OF THE PREFERRED EMBODIMENT

Figure 1:
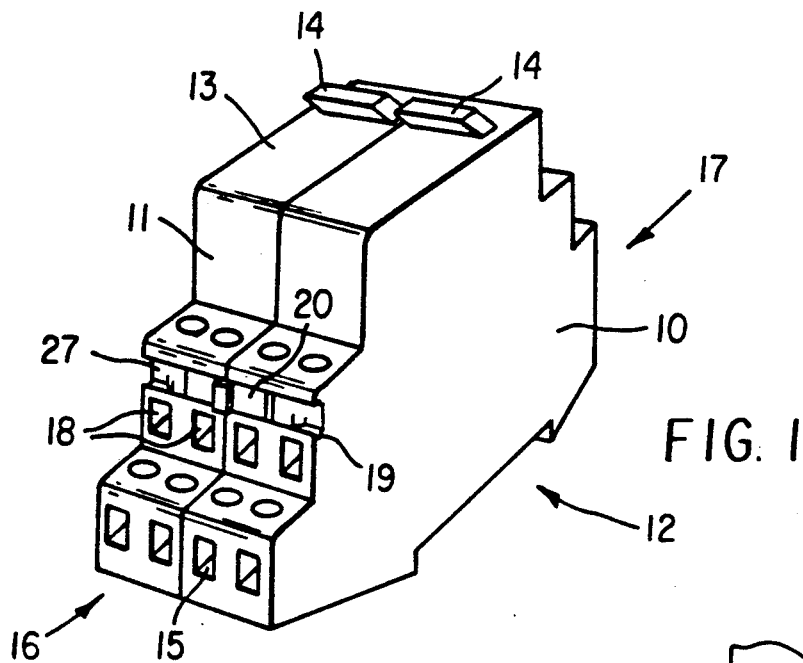
FIG. 1 is a schematic perspective view of two modules or cases assembled by the device according to the invention.
Figure 2:
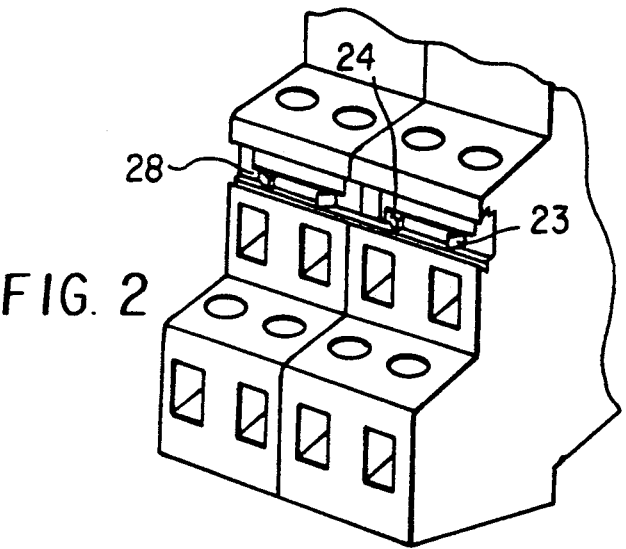
FIG. 2 is a partial view of FIG. 1, the assembly runner being assumed to have been removed.
Figure 3:
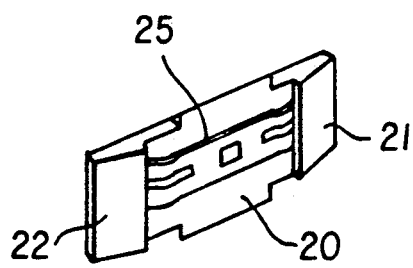
FIG. 3 is a schematic perspective view of the rear of the runner according to FIG. 1.
Figure 4:
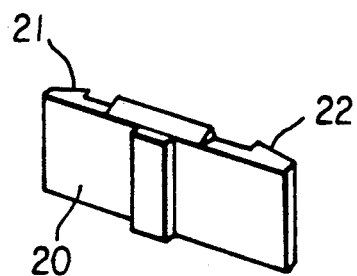
FIG. 4 is a similar view to that of FIG. 3 of the runner seen from the front.

In FIGS. 1 and 2, modules or units, for instance miniature molded cases 10,11 of remote-controlled switches, are adjoined and assembled to form a multipole unit. Each molded case 10,11 is clipped in the usual manner by its rear face 12 onto a symmetrical profile support rail (not shown). The front face 13 of the cases 10,11 is fitted with a manual operating handle 14 of the remote-controlled switch. Power connection terminals 15 are arranged on the narrow side faces 16,17, whereas the successive cases 10,11 are adjoined by their large side faces. On these narrow side faces 16,17 there are also arranged external connection terminals 18 located above and set back from the power terminals 15. On each of these narrow side faces 16,17, a slide 19 is in addition provided, which extends above the external connection terminals 18, in a manner perpendicular to the large faces of the case over its whole width. In the slide 19 a dove-tail shaped runner 20 is slidingly mounted. The two ends 21,22 of the runner 20 are shaped as hooks able to clip onto conjugate protrusions 23,24 arranged on the bottom of the slide 19. In the assembled position represented in FIG. 1, the runner 20 overlaps the interface between the two cases 10,11 and its end hooks 21,22 are clipped onto the conjugate protrusions 23,24 of the cases 10,11 to keep the latter assembled. Each case 10,11 is supplied with its runners 20 in the central position in the slide 19, and after the two cases 10,11 have been adjoined, the runner is moved in the direction of the other case to the overlapping and assembled position, represented in FIG. 1, the slopes of the protrusions 23,24 and hooks 21,22 being arranged to achieve clipping together in this overlapping position. An assembly device of this kind by sliding runners 20 is described in detail in U.S. Pat. No. 4,591,228, which should advantageously be referred to for further details.

According to the present invention, the runner 20 bears on its face internal to the slide 19 a flexible metal blade 25 forming an electrical contact bridge extending in the sliding direction of the runner 20. In the bottom 26 of the slide 19 there is arranged a contact pad 27 designed to cooperate with the contact bridge 25. The contact pad 27 is formed by an end of a connecting strip 28, whose other end 29 is inserted in an external connection terminal 18. The contact pad 27 is housed in a groove 30 with limited opening, arranged in the bottom of the slide 19 to prevent any accidental contact.

Figure 8:
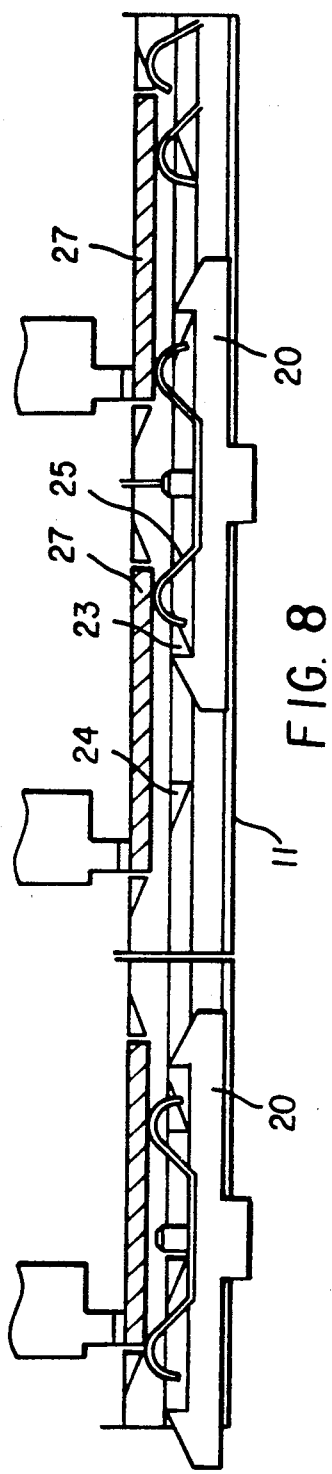
FIG. 8 is a cross sectional view according to the line 8—8 of FIG. 7, illustrating assembly of three cases, two embodiments of the runner contact bridge being shown.

Referring more particularly to FIG. 8, it can be seen that a runner 20 in the assembled position of two cases 10,11 provides an electrical connection between the contact pads 27 of these two modules. The electrical connection via the contact bridge 25 between the two cases 10 and 11 is established at the same time as their mechanical assembly by the runner 20. FIG. 8 shows on the left-hand part a runner 20 in the inactive position and it can easily be seen that by sliding it to the right, it is possible to assemble the case corresponding to case 11 while also providing the electrical connection.

The assembly device according to the invention is applicable to different types of modules, two of which are described below, with reference to FIGS. 9 and 10.

Figure 9:
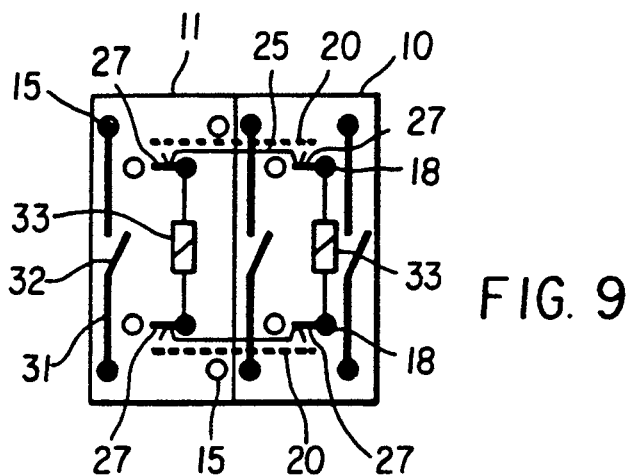
FIG. 9 illustrates two cases adjoined, each having four housings for power terminals.
Figure 10:
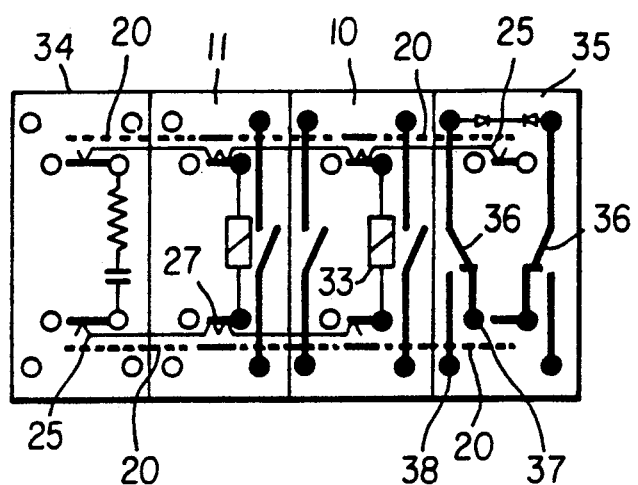
FIG. 10 illustrates an assembly of two auxiliary modules to the assembled cases according to FIG. 9.

In FIG. 9 we can see the two cases 10,11 adjoined, each having four housings for power terminals 15, two of which are not used in case 11. Each pair of opposite terminals 15 has associated with it a power circuit 31 comprising a pair of contacts 32 actuated by a coil 33 via a mechanism, not represented, for instance of the remote-controlled switch type causing a position change of the contacts 32 at each control impulse of the coil 33. The coil 33 is connected to two opposite external connection terminals 18, and each of these terminals 18 has a contact pad 27 connected to it. In the example illustrated by FIG. 9, the other two external connection terminal housings of each case 10,11 are not used. The contact bridges 25 of the runners 20 cooperate with the contract pads 27 of the two cases 10,11 to connect the two coils 33 in parallel. It can be understood that the two power supply wires (not represented) of the coils 33 merely have to be connected to the external connection terminals of a case to automatically supply the coils 33 of the two cases 10,11. By assembling a single-pole molded case case remote-controlled switch 11 to a two-pole molded case remote-controlled switch 10, we obtain a three-pole remote-controlled switch the two operating coils 33 of which are parallel connected by the runners 20 mechanically assembling the two cases 10,11. It is clear that the cases 10,11 could both contain two-pole or single-pole remote-controlled switches or switchgear of a different type, notably contactors, and that the assembly device can be used for connection of other modules, notably standard auxiliary remote-controlled switch modules. FIG. 10 illustrates as an example assembly of two auxiliary modules 34,35 to the assembled cases 10,11 according to FIG. 9. The cases of the auxiliary modules 34,35 are identical to the cases 10,11 and the left-hand module 34 constitutes a load module which in a manner well-known in itself enables an impedance to be connected in parallel to the control circuit of the coils 33. The module 34 is assembled to the case 11 by the two runners 20 in the manner described above, both of the runners 20 comprising a contact bridge 25 which cooperates with the contact pad 27 of the case 11. The module 35 adjoined to the right of the case 10 is a differentiation module of the opening and closing orders of the remote-controlled switches 10,11. The module 35 is arranged for double control each of which comprises a changeover contact 36 mechanically coupled to the contact of the case 10. In the open position represented in FIG. 10, only a closing order applied to the terminal 37 is transmitted to the remote-controlled switch, an opening order applied to the terminal 38 being inhibited. On closing of the remote-controlled switch 10,11, the changeover contact 36 rocks in the opposite direction, in such a way as to transmit an opening order applied to the terminal 38 and to prevent transmission of an order by application of a signal to the terminal 37. A runner 20 with contact bridge 25 electrically connects the module 35 to the case 10 to apply the orders to the coils 33. The runner 20 on the opposite side face is not provided with a contact bridge 25, a second electrical connection between the modules being in this case pointless. Depending on the installations, the modules 34,35 can be replaced by modules of a different type, well-known to those specialized in the art, or additional modules can be adjoined to the modules represented in FIG. 10 to achieve a more elaborate system. The terminals 18 are available for external connections of the control circuits and if required for additional connections which could not be achieved by the runners 20. The modules are interchangeable and the assembly forms a simple modular system which is easy to implement.

The invention has been described in relation to standard cases 10,11 all having two pairs of housings for power terminals 15, and two pairs of housings for external connection terminals 18, some of which are sometimes not used. It can easily be understood that the assembly system can be used with cases having a smaller number of terminals or being equipped only with the terminals necessary for the switchgear housed in this case. If the module is always used in association with another module, the external connection terminals 18 can be suppressed, electrical connection still being achieved by the contact pads 27 directly connected to the auxiliary or control circuit of the module. Connection of the external control circuit can furthermore be achieved in a different manner, for example by connecting clips.

Figure 5:
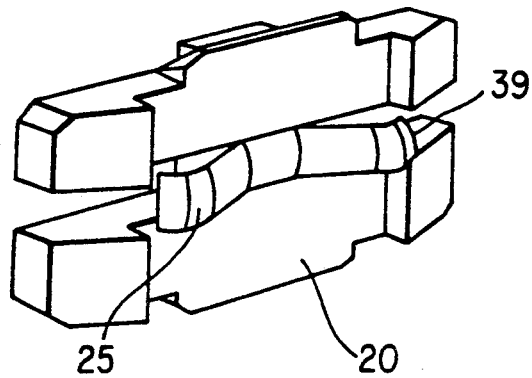
FIG. 5 is a similar view to that of FIG. 3, illustrating an alternative embodiment of the runner.
Figure 6:
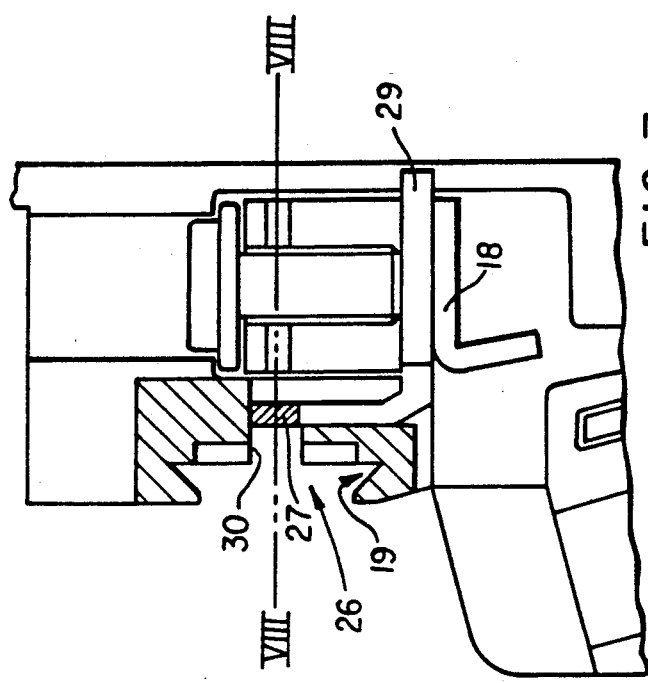
FIG. 6 is a side view on an enlarged scale showing the connecting strip between the external connection terminal and the contact pad of the case according to FIG. 1.
Figure 7:
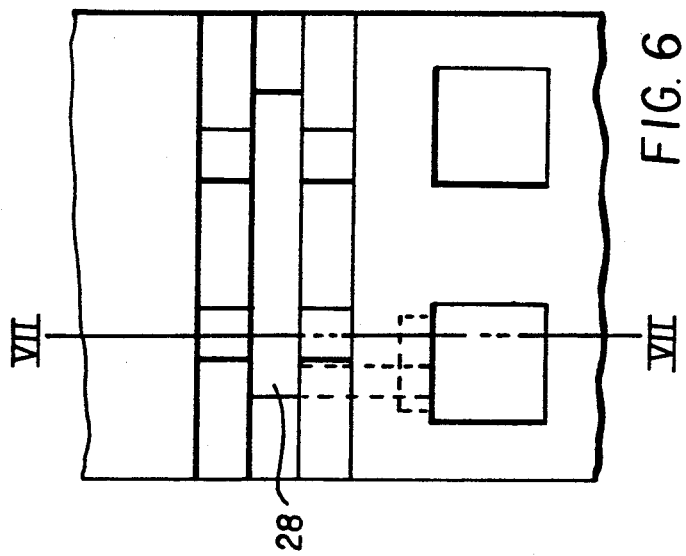
FIG. 7 is a cross sectional view according to the line 7—7 of FIG. 6.

FIG. 5 illustrates an alternative embodiment of the runner 20 formed by a part molded in a single piece, whose center part 39 is arranged in the form of a contact bridge 25. The center part 39 is coated with a conducting layer forming the contact bridge 25. The same part without a conducting layer can be used as runner 20 providing only a mechanical assembly between the cases. Other embodiments of the runner 20 are moreover possible and if the number of mechanical or electrical connections between two adjacent modules is greater than two, a system can be designed using more than two assembly runners.

The invention is naturally in no way limited to the embodiment particularly described.

We claim:

1. A device for assembling two adjacent mold cases, each case housing a miniature electrical switchgear having a circuit, notably a control circuit, and two external connection terminals connected to the circuit, said device comprising:
    a fast-fixing connecting runner having protruding parts which overlap an interface of the two cases in an active position, and whose protruding parts on both sides of said interface are each secured to one of the cases to mechanically assemble the two cases;
    wherein said runner includes a slide member made of insulating material and an electrical contact bridge, and each of said cases includes contact pads, which face said protruding parts of said runner, are connected to said external connection terminals, and cooperate with said electrical contact bridge to achieve an electrical connection between said contacts pads in said active position, and slides, arranged in said cases on narrow side faces thereof, in which said runner is slidingly mounted; and
    wherein said slides include protrusions for clip-fastening of said protruding parts of said runner.

2. The assembly device according to claim 1, wherein each slide of each case extends over the whole width of the narrow side face of the case and said runner is capable of moving in a lateral direction to one or the other side of the case.

3. The assembly device according to claim 1, wherein said contact pads are housed in bottoms of said slides and said contact bridge is located on a face of the runner facing said bottoms to cooperate with the contact pads in the active position of the runner.

4. The assembly device according to claim 3, wherein the contact bridge comprises a flexible metal blade fixed to said slide member of said runner.

5. The assembly device according to claim 3, wherein said contact bridge comprises a metal layer deposited on a portion of said slide member of said runner.

* * * * *